US012395544B2

(12) United States Patent
Kawamoto

(10) Patent No.: US 12,395,544 B2
(45) Date of Patent: Aug. 19, 2025

(54) INFORMATION PROCESSING APPARATUS

(71) Applicant: Inpleet Inc., Tokyo (JP)

(72) Inventor: Kyoichi Kawamoto, Tokyo (JP)

(73) Assignee: INPLEET INC., Tokyo (JP)

( * ) Notice: Subject to any disclaimer, the term of this patent is extended or adjusted under 35 U.S.C. 154(b) by 0 days.

(21) Appl. No.: 18/950,172

(22) Filed: Nov. 18, 2024

(65) Prior Publication Data

US 2025/0220066 A1 Jul. 3, 2025

(30) Foreign Application Priority Data

Dec. 27, 2023 (JP) ................. 2023-221104

(51) Int. Cl.
*H04L 67/02* (2022.01)

(52) U.S. Cl.
CPC .................... *H04L 67/02* (2013.01)

(58) Field of Classification Search
CPC ..... H04L 9/3213; H04L 2209/56; H04L 9/50; H04L 67/02; G06Q 30/02; G06F 16/951
See application file for complete search history.

(56) References Cited

U.S. PATENT DOCUMENTS

| | | | | |
|---|---|---|---|---|
| 10,078,623 B2* | 9/2018 | Arav | ...................... | G06F 40/134 |
| 2010/0307037 A1* | 12/2010 | Chi | ........................ | E04H 13/003 |
| | | | | 40/124.5 |
| 2010/0325699 A1* | 12/2010 | Kaczmarek | ............ | G06Q 10/10 |
| | | | | 709/205 |
| 2016/0275103 A1* | 9/2016 | Robinson | ............. | G06Q 10/087 |
| 2016/0344675 A1* | 11/2016 | Samaras | .................. | H04L 51/52 |
| 2019/0236366 A1* | 8/2019 | Mangum | ............... | H04W 4/023 |
| 2023/0130182 A1* | 4/2023 | Mir | ........................ | H04L 9/3297 |
| | | | | 713/189 |
| 2023/0385815 A1* | 11/2023 | Jakobsson | ............... | G06Q 20/36 |
| 2024/0283648 A1* | 8/2024 | Richter | ................. | H04L 9/0861 |

FOREIGN PATENT DOCUMENTS

| | | | |
|---|---|---|---|
| JP | 2002-251488 A | | 9/2002 |
| JP | 2002251487 A | * | 9/2002 |
| JP | 2019-121328 A | | 7/2019 |

OTHER PUBLICATIONS

Taro Shinbashi, "4th time of club Internet Club Internet" ASAHI personal computer No. 238, Feb. 19, 1999, pp. 112-113, Japan, Asahi Shimbun Publishing, 7pp.

(Continued)

*Primary Examiner* — Chirag R Patel
(74) *Attorney, Agent, or Firm* — HAUPTMAN HAM, LLP

(57) ABSTRACT

An information processing apparatus manages a website including a temple/shrine webpage relating to a virtual temple or shrine and a grave webpage relating to a virtual grave. On the temple/shrine webpage, a link to directly or indirectly proceed to a first webpage on an NFT market place on which an owner of a temple/shrine content relating to the temple/shrine webpage is published is posted, and a link to directly or indirectly proceed to the grave webpage is posted. On the grave webpage, a link to directly or indirectly proceed to a second webpage on the NFT market place on which an owner of a grave content relating to the grave webpage is published is posted.

6 Claims, 8 Drawing Sheets

(56) References Cited

OTHER PUBLICATIONS

Coincats Channel, "[For Beginners] Let's Buy and Sell NFTs! How to List and Buy Using OpenSea <Jul. 2021 Edition>", YouTube, Jul. 16, 2021, [retrieved Sep. 20, 2024], URL:http://www.youtube.com/watch?v=AvvvYN4wAEIE, 4pp.

NFT Tokyo, "300,000 Bid for NFT of Actor Toshihisa Hagiwara at Adam by GMO" Online, May 25, 2023 [retrieved Sep. 19, 2024], URL:https://web.archive.org/web/20230525041557/https://tokyo-nft.co.jp/archives/7602, 8pp.

Todai Shimbun Online, "What is the Internet of NFT, Asking GMO Adam, Who Made a Splash with the NFT of 'Senmeri' Song?", Online, Nov. 30, 2023 [retrieved Sep. 20, 2024], URL:https://web.archive.org/web/20231130051409/https://www.todaishimbun.org/nft_20220522/, 13pp.

Office Action in JP application No. 2024-118303, dated Feb. 18, 2025, 6pp.

\* cited by examiner

| USER ID | USER NAME | PASSWORD | DECEASED NAME | TEMPLE/ SHRINE ID | GRAVEYARD ID | GRAVE ID | CONTENT ID |
|---|---|---|---|---|---|---|---|
| | | | | | | | |
| | | | | | | | |
| | | | | | | | |

Fig. 3

| TEMPLE/ SHRINE ID | TEMPLE/ SHRINE NAME | TEMPLE/ SHRINE IMAGE | TEMPLE/SHRINE TOKEN ID | FIRST WEBPAGE'S URL | GRAVEYARD WEBPAGE'S URL |
|---|---|---|---|---|---|
| | | | | | |
| | | | | | |
| | | | | | |

Fig. 4

| GRAVEYARD ID | PLOT IMAGE | PLOT TOKEN ID | SECOND WEBPAGE'S URL | GRAVE WEBPAGE'S URL |
|---|---|---|---|---|
| | | | | |
| | | | | |
| | | | | |

Fig. 5

| GRAVE ID | GRAVE IMAGE | GRAVE TOKEN ID | THIRD WEBPAGE'S URL | PROFILE WEBPAGE'S URL |
|---|---|---|---|---|
| | | | | |
| | | | | |
| | | | | |

Fig. 6

| CONTENT ID | DECEASED IMAGE | CONTENT TOKEN ID | FOURTH WEBPAGE'S URL |
|---|---|---|---|
| | | | |
| | | | |
| | | | |

Fig. 7

INFORMATION PROCESSING APPARATUS

CROSS-REFERENCE TO RELATED APPLICATIONS

This application is based upon and claims the benefit of priority from the prior Japanese Patent Application No. 2023-221104, filed Dec. 27, 2023 the entire contents of which are incorporated herein by reference.

FIELD

An embodiment of the present invention relates to an information processing apparatus.

BACKGROUND

Regularly visiting a grave takes considerable time and effort for families, and this has become more problematic in the recent aging trend. In view of this, in order to reduce the time and effort for grave visiting, there are techniques for building a virtual grave on the Internet and allowing a grave visiting (see Japanese Patent Laid-Open No. 2002-251488, for example). According to such techniques, even a family member who has difficulty visiting the real grave because of their age or the like can visit the virtual grave, rather than the real grave, as far as the family member has an information processing terminal such as a smartphone connected to the Internet, so that grave visiting by the family is facilitated, and the burden of maintenance and management of the grave by the family is reduced. Furthermore, grave visiting by a friend of a deceased who hesitates to visit the real grave is also facilitated. However, virtual graves can be easily built on the Internet by a simple user operation on the information processing terminal, and therefore, a number of virtual graves of a particular deceased may be built. For example, if a number of virtual graves of a famous deceased person are built, concerned persons and fans of the deceased person have to determine which grave they should visit. Of course, concerned persons and fans of a famous deceased person would want to visit the legitimate virtual grave, such as the virtual grave corresponding to the real grave of the deceased person. However, it is difficult to determine which is the legitimate virtual grave among a plurality of virtual graves on the Internet by simply seeing the virtual graves.

An object of the present invention is to provide a user with information that serves as a basis for determining whether a virtual grave of a deceased built on the Internet is legitimate.

SUMMARY OF THE INVENTION

An information processing apparatus according to the present disclosure manages a website including a temple/shrine webpage relating to a virtual temple or shrine and a grave webpage relating to a virtual grave. The information processing apparatus includes means for receiving a first transmission request for the temple/shrine webpage from an external information processing terminal, means for transmitting data of the temple/shrine webpage to the information processing terminal in response to the received first transmission request, means for receiving a second transmission request for the grave webpage from the external information processing terminal, and means for transmitting data of the grave webpage to the information processing terminal in response to the received second transmission request. On the temple/shrine webpage, a link to directly or indirectly proceed to a first webpage on an NFT market place on which an owner of a temple/shrine content relating to the temple/shrine webpage is published is posted, and a link to directly or indirectly proceed to the grave webpage is posted. On the grave webpage, a link to directly or indirectly proceed to a second webpage on the NFT market place on which an owner of a grave content relating to the grave webpage is published is posted.

BRIEF DESCRIPTION OF THE VIEWS OF THE DRAWING

FIG. 3 is a diagram showing an example of a user information management table stored in a storage device shown in FIG. 2.

FIG. 4 is a diagram showing an example of a temple/shrine information management table stored in the storage device shown in FIG. 2.

FIG. 5 is a diagram showing an example of a graveyard information management table stored in the storage device shown in FIG. 2.

FIG. 6 is a diagram showing an example of a grave information management table stored in the storage device shown in FIG. 2.

FIG. 7 is a diagram showing an example of a profile information management table stored in the storage device shown in FIG. 2.

DETAILED DESCRIPTION

Figure 1:
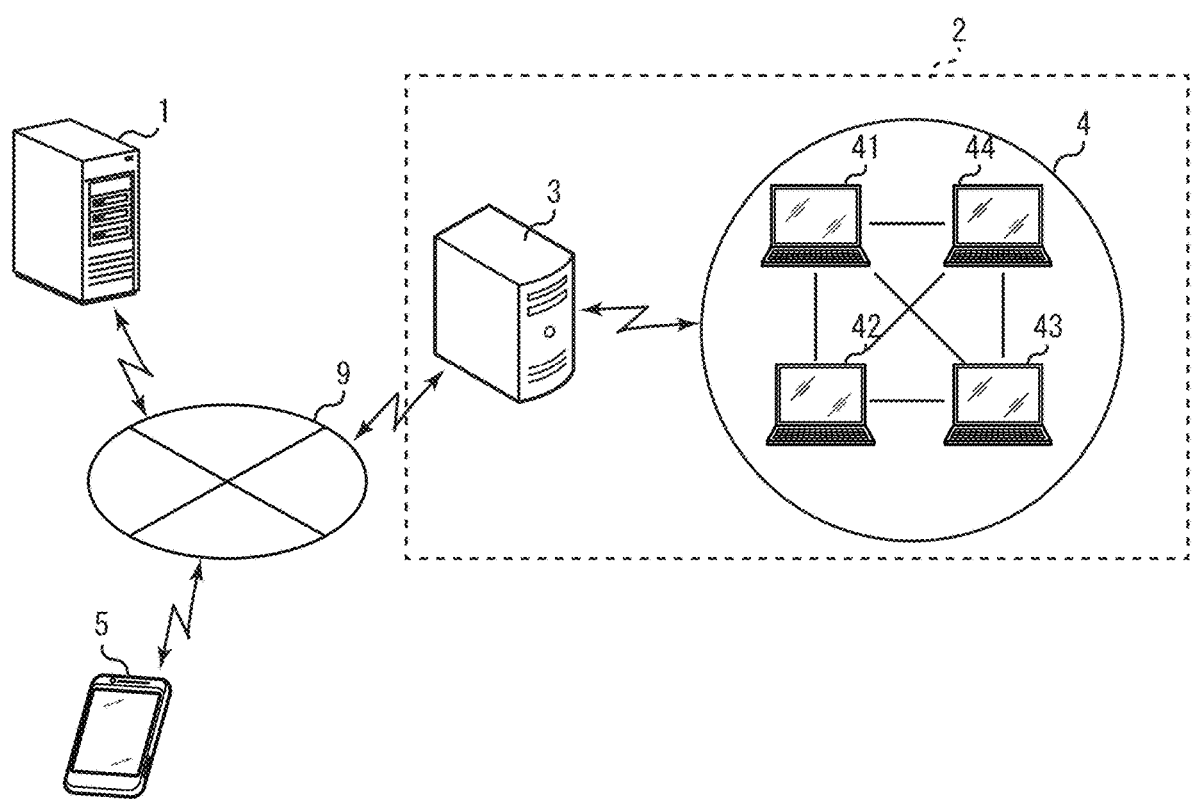
FIG. 1 is a diagram showing a configuration of a system including an information processing apparatus according to an embodiment.

In the following, an information processing apparatus according to an embodiment will be described with reference to the drawings. In the following description, components having substantially the same functions or configurations will be denoted by the same reference numerals, and redundant descriptions thereof will be given only when needed.

The information processing apparatus according to this embodiment (referred to simply as the information processing apparatus, hereinafter) has a function of managing a virtual grave on the Internet. Specifically, the information processing apparatus manages a virtual grave-visiting website including a webpage (temple/shrine webpage) relating to a virtual temple or shrine, a webpage (graveyard webpage) relating to a virtual graveyard, a webpage (grave webpage) relating to a virtual grave and a webpage (profile webpage) relating to a content of a deceased (deceased content) enshrined in a virtual grave, receives a transmission request from an information processing terminal (user terminal) such as a smartphone and transmits a webpage to the user terminal in accordance with the received transmission request. This allows the user terminal to display the temple/shrine webpage, the graveyard webpage, the grave webpage and the profile webpage. In this embodiment, the temple/shrine webpage represents a virtual temple or shrine, the graveyard webpage represents a virtual graveyard, and the grave webpage represents a virtual grave.

One characteristic of the information processing apparatus according to this embodiment is that the information processing apparatus has a function of providing a user visiting a virtual grave (grave webpage) built on the Internet with information that serves as a basis for determining whether the virtual grave (grave webpage) is a legitimate virtual grave.

Terms used in this embodiment are defined as follows.

Virtual grave-visiting website: a website that implements a virtual grave visiting on the Internet. In this embodiment, the virtual grave-visiting website is formed by four layers, including a first layer that provides a temple/shrine webpage (homepage), a second layer that provides a graveyard webpage, a third layer that provides a grave webpage and a fourth layer that provides a profile webpage.

Virtual temple/shrine: a virtual temple or shrine on the Internet. Typically, an owner of a virtual temple or shrine is the same as an owner of a real temple or shrine. Note that the temple or shrine is not limited to a temple or shrine but may be a church or other religious facility. For example, a virtual graveyard is set up in the premises of a virtual temple or shrine, and a virtual grave is built in a virtual plot in the virtual graveyard.

Virtual graveyard: a virtual graveyard on the Internet. Typically, a manager of a virtual graveyard is the same as a manager of a real graveyard. Note that the term "graveyard" herein includes a cemetery or other similar facility.

Virtual grave: a virtual grave on the Internet. A real grave is built in a leased plot of a real graveyard. Similarly, the virtual grave is built in a leased virtual plot in the virtual graveyard. Of course, the virtual grave may be built on a purchased virtual plot of the virtual graveyard. Typically, the owner of a virtual grave is the same as the owner of a real grave. The virtual grave is represented by a tree, a stone (tomb) or the like. Of course, the virtual grave may be represented by a mound built in a part of the virtual plot. Note that the virtual grave may be a virtual tombstone, a virtual headstone or the like.

Deceased content: an image (deceased image), a video (deceased video) or the like relating to a deceased enshrined in a virtual grave. Typically, an owner of a deceased content is the same as an owner of a virtual grave.

NFT: an NFT is used to authenticate the ownership of a digital content and is issued in conformity with the ERC721 standard in the ETHEREUM (registered trademark) block chain. An NFT is formed by a token ID for identifying the NFT, an owner (owner) address of an owner who owns the NFT, and a toke uniform resource identifier (URI), for example. These items of information are recorded in a block chain (a distributed ledger). The token ID has a specific value for itself. The token URI is an attribute that indicates the location of metadata of a content associated with the NFT. The metadata includes a name and a description of the content, the URL of the data, the owner of the data, the history of the owner and the like. In this embodiment, NFT conversion means recording digital data in a block chain as a token. The token ID and owner information (owner information) is associated with the digital data recorded in the block chain (converted into an NFT).

As shown in FIG. 1, an information processing apparatus 1 according to this embodiment is connected to an information processing terminal (user terminal) 5 and an NFT management system 2 over a network 9. The information processing apparatus 1 has a management function of managing a virtual grave-visiting website, a reception function of receiving a transmission request for a webpage from the user terminal 5, and a transmission function of transmitting a webpage to the user terminal 5 in accordance with the received transmission request. The reception function and the transmission function may be implemented by a web server apparatus that practically stores the webpages forming the virtual grave-visiting website.

The NFT management system 2 is an information processing system for managing an NFT (token ID, owner address, URI and the like). The NFT managed by the NFT management system 2 is recorded on a block chain 4. The block chain 4 is formed by a plurality of nodes (computers) 41, 42, 43 and 44, and manages information concerning an NFT in a distributed manner so that the information is difficult to tamper with. In this embodiment, an URL, a token ID (temple/shrine token ID) and owner information of a temple/shrine image converted into an NFT, an URL, a token ID (plot token ID) and owner information of a plot image converted into an NFT, an URL, a token ID (grave token ID) and owner information of a grave image converted into an NFT, and an URL, a token ID (content token ID) and owner information of a deceased image converted into an NFT are recorded on the block chain 4. Thus, the owner information of each image converted into an NFT is ensured by the block chain 4. As the block chain 4, a common public block chain can be used which has no restriction as to participants, such as ETHEREUM (registered trademark) or OPENSEA (registered trademark). Of course, a private block chain 4 that allows only particular users to participate may be used as the block chain 4.

An NFT management server apparatus 3 has a hardware configuration of a typical computer and has a function relating to an NFT market place. Specifically, on the NFT market place, the NFT management server apparatus 3 manages a webpage formed by a set of information collected in a predetermined format concerning an NFT recorded on the block chain 4. For example, on the NFT market place, a webpage (first webpage) containing a temple/shrine image converted into an NFT and a temple/shrine token ID and owner information associated with the temple/shrine image converted into an NFT, a webpage (second webpage) containing a plot image converted into an NFT and a plot token ID and owner information associated with the plot image converted into an NFT, a webpage (third webpage) containing a grave image converted into an NFT and a grave token ID and owner information associated with the grave image converted into an NFT, and a webpage (fourth webpage) containing a deceased image converted into an NFT and a content token ID and owner information associated with the deceased image converted into an NFT are managed. These webpages are assigned an URL. The NFT management server apparatus 3 has a reception function of receiving a transmission request for a webpage based on the URL from the user terminal 5 and a transmission function of transmitting a webpage corresponding to the URL to the user terminal 5. In this way, the first webpage, the second webpage, the third webpage and the fourth webpage can be displayed on the user terminal 5. Note that each image converted into an NFT can be distributed on the NFT market place, and the owner information includes history information.

Figure 2:
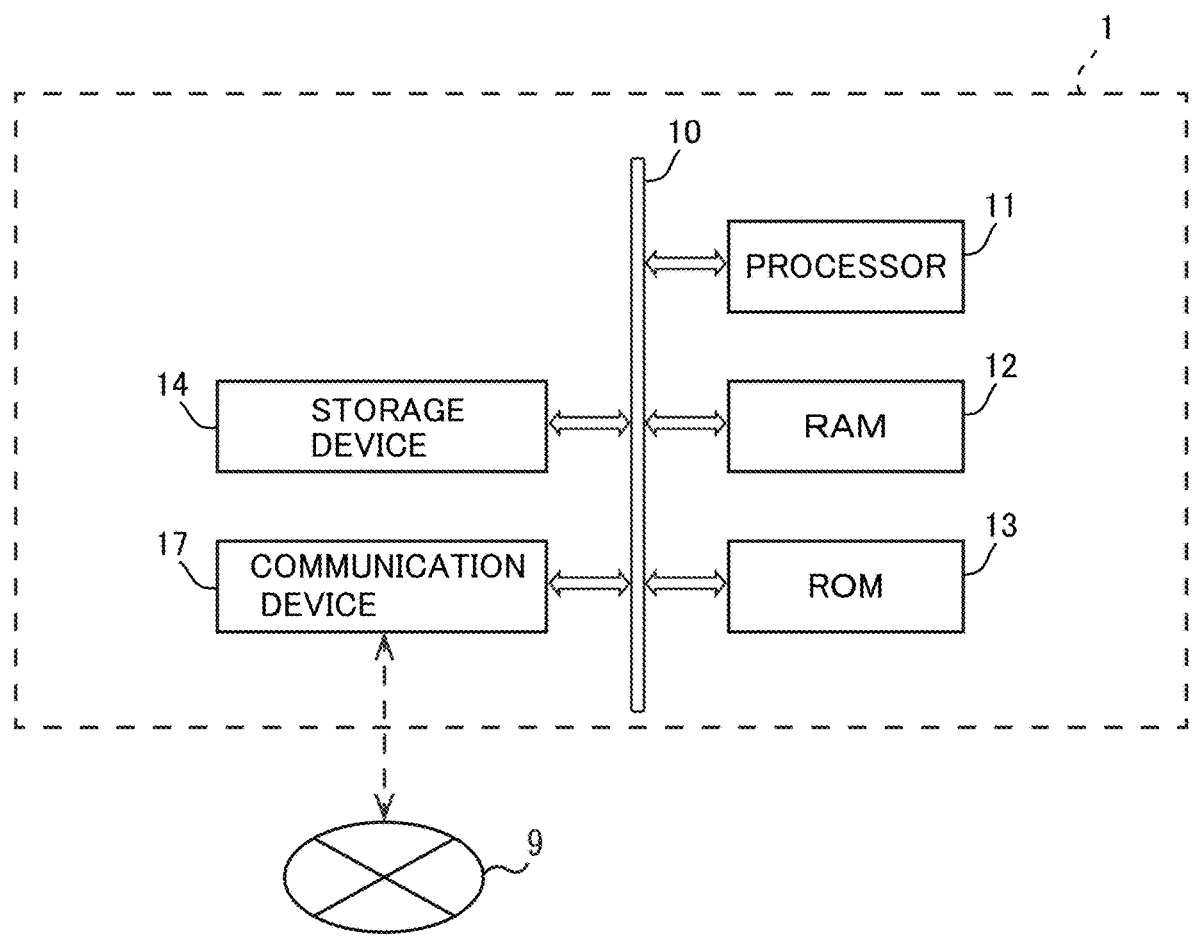
FIG. 2 is a diagram showing a configuration of the information processing apparatus shown in FIG. 1.

In the information processing apparatus 1, as shown in FIG. 2, a RAM 12, a ROM 13, a storage device 14 and a communication device 17 are connected to a processor 11 via a data/control bus 10. The processor 11 is formed by a central processing unit (CPU) and a graphics processing unit (GPU). The RAM 12 serves as a main memory, a work area or the like for the processor 11. The ROM 13 stores data of a basic input output system (BIOS), an operating system program (OS) or the like executed by the processor 11. The storage device 14 stores various programs for implementing the functions of the virtual grave-visiting website. The communication device 17 has a communication module in conformity with an arbitrary standard and transmits and receives data to and from the user terminal 5 and the NFT management server apparatus 3 under the control of the processor 11.

FIG. 3 shows an example of a user information management table stored in the storage device 14. As shown in FIG. 3, in the user information management table, a user ID that uniquely identifies a user is associated with a user name, a password, a deceased name, a temple/shrine ID, a graveyard ID, a grave ID and a content ID. The user name and the password are login information that is required when a user logs in to the virtual grave-visiting website. The deceased name is the name of a deceased enshrined in a virtual grave. When a plurality of deceased persons are enshrined in a virtual grave, a plurality of deceased names are associated with the single user ID. The temple/shrine ID is an example of identification information for identifying a virtual temple or shrine. The graveyard ID is an example of identification information for identifying a virtual graveyard. The grave ID is an example of identification information for identifying a virtual grave. The content ID is an example of identification information for identifying a deceased content. A plurality of content IDs may be associated with a deceased name.

FIG. 4 shows an example of a temple/shrine information management table stored in the storage device 14. As shown in FIG. 4, in the temple/shrine information management table, the temple/shrine ID is associated with a temple/shrine name, a temple/shrine image, a temple/shrine token ID, a first webpage URL and a graveyard webpage URL. The temple/shrine image is an image converted into an NFT and is typically a material image forming the temple/shrine webpage. However, the temple/shrine image is not limited to material images of the temple/shrine webpage, as far as a user seeing the temple/shrine image can recognize the temple/shrine image as an image relating to the temple/shrine webpage. For example, the temple/shrine image may be an image that is not used in the temple/shrine webpage, such as an image of the appearance of the virtual temple or shrine or an image of a sign of the virtual temple or shrine. Alternatively, the temple/shrine image may be an image relating to a real temple or shrine, such as an image of the appearance of a real grave corresponding to a virtual grave. The temple/shrine token ID is a non-fungible token ID associated with a temple/shrine image converted into an NFT. The first webpage URL is the URL of a webpage on the NFT market place on which owner information of a temple/shrine image converted into an NFT is published. The graveyard webpage URL is the URL of a graveyard webpage to which a user proceeds from a temple/shrine webpage.

FIG. 5 shows an example of a graveyard information management table stored in the storage device 14. As shown in FIG. 5, in the graveyard information management table, the graveyard ID is associated with a graveyard name, a plot image, a plot token ID, a second webpage URL and a grave webpage URL. The plot image is an image converted into an NFT and an image representing the appearance of a virtual plot in a virtual graveyard. The plot image is typically a material image forming the graveyard webpage. However, the plot image is not limited to material images of the graveyard webpage, as far as a user seeing the plot image can recognize the plot image as an image relating to the graveyard webpage. For example, an image relating to the appearance of a virtual graveyard and an image relating to a sign of a virtual graveyard are also examples of the plot image. Furthermore, an image relating to a real graveyard, such as an image of the appearance of a real graveyard corresponding to a virtual graveyard, is also an example of the plot image. The plot token ID is a non-fungible token ID associated with a plot image converted into an NFT. The second webpage URL is the URL of a webpage on the NFT market place on which owner information of a plot image converted into an NFT is published. The grave webpage URL is the URL of a grave webpage to which a user proceeds from a graveyard webpage.

FIG. 6 shows an example of a grave information management table stored in the storage device 14. As shown in FIG. 6, in the grave information management table, the grave ID is associated with a grave image, a grave token ID, a third webpage URL and a profile webpage URL. The grave image is an image converted into an NFT and is typically a material image forming the grave webpage. However, the grave image is not limited to material images of the grave webpage, as far as a third party seeing the grave image can recognize the grave image as an image relating to the grave webpage. For example, the grave image may be an image that is not used in the grave webpage, such as an image relating to the appearance of a virtual grave or an image relating to a sign of a virtual grave. Alternatively, the grave image may be an image relating to a real grave, such as an image of the appearance of a real grave corresponding to a virtual grave. The grave token ID is a non-fungible token ID associated with a grave image converted into an NFT. The third webpage URL is the URL of a webpage on the NFT market place on which owner information of a grave image converted into an NFT is published. The profile webpage URL is the URL of a profile webpage to which a user proceeds from a grave webpage.

FIG. 7 shows an example of a profile information management table stored in the storage device 14. As shown in FIG. 7, in the profile information management table, the content ID is associated with a deceased image, a content token ID and a fourth webpage URL. The deceased image is an image converted into an NFT. The content token ID is a non-fungible token ID associated with a deceased image converted into an NFT. The fourth webpage URL is the URL of a webpage on the NFT market place on which owner information of a deceased image converted into an NFT is published.

Figure 8:
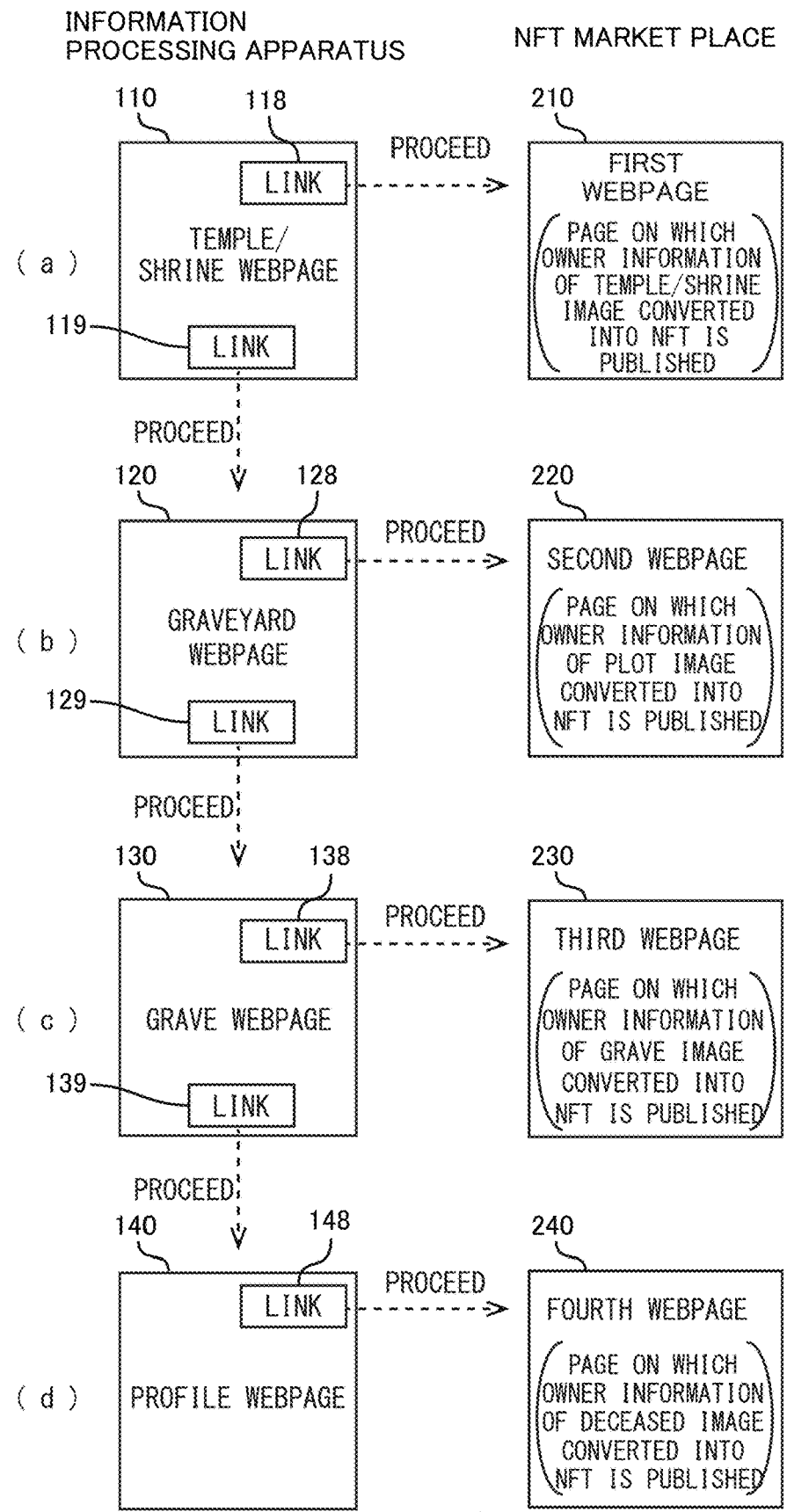
FIG. 8 is a diagram showing an overview of a configuration of a virtual grave-visiting website managed by the information processing apparatus according to the embodiment.

FIG. 8 is a diagram showing an overview of the virtual grave-visiting website managed by the information processing apparatus 1. As shown in FIG. 8, the virtual grave-visiting website includes a temple/shrine webpage 110, a graveyard webpage 120, a grave webpage 130 and a profile webpage 140. As described later, it is an essential point that the grave webpage 130 does not independently exists on the Internet but forms one virtual grave-visiting website along with the graveyard webpage 120 relating to a virtual graveyard and the temple/shrine webpage 110 relating to a virtual temple or shrine, and the owner of the virtual grave is different from the manager (owner) of the virtual graveyard and the owner of the virtual temple or shrine.

On the temple/shrine webpage 110, a link 119 to directly or indirectly proceed to the graveyard webpage 120 and a link 118 to directly or indirectly proceed to a first webpage 210 are posted. On the graveyard webpage 120, a link 129 to directly or indirectly proceed to the grave webpage 130 and a link 128 to directly or indirectly proceed to a second webpage 220 are posted. On the grave webpage 130, a link 139 to directly or indirectly proceed to the profile webpage 140 and a link 138 to directly or indirectly proceed to a third webpage 230 are posted. On the profile webpage 140, a link 148 to directly or indirectly proceed to a fourth webpage 240 is posted.

Note that directly proceeding to the graveyard webpage 120 means proceeding from the temple/shrine webpage 110 to the graveyard webpage 120 without passing through any other webpage. The link 129 to directly proceed to the graveyard webpage 120 specifies the URL of the graveyard webpage 120. On the other hand, indirectly proceeding to the graveyard webpage 120 means temporarily proceeding from the temple/shrine webpage 110 to another webpage and then proceeding from the other webpage to the graveyard webpage 120 automatically or through a user operation on the other webpage. The link 129 to indirectly proceed to the graveyard webpage 120 specifies the URL of the other webpage described above. These descriptions hold true for the other links shown in FIG. 8. Furthermore, indirectly proceeding to the first webpage 210 on the NFT market place may mean proceeding to the first webpage 210 via the NFT management server apparatus 3. For example, the NFT management server apparatus 3 receives a command, a token ID and a search word such as owner information for accessing the first webpage 210 from the user terminal 5, obtains the first webpage 210 using these, and transmits the first webpage to the user terminal 5.

Figure 9:
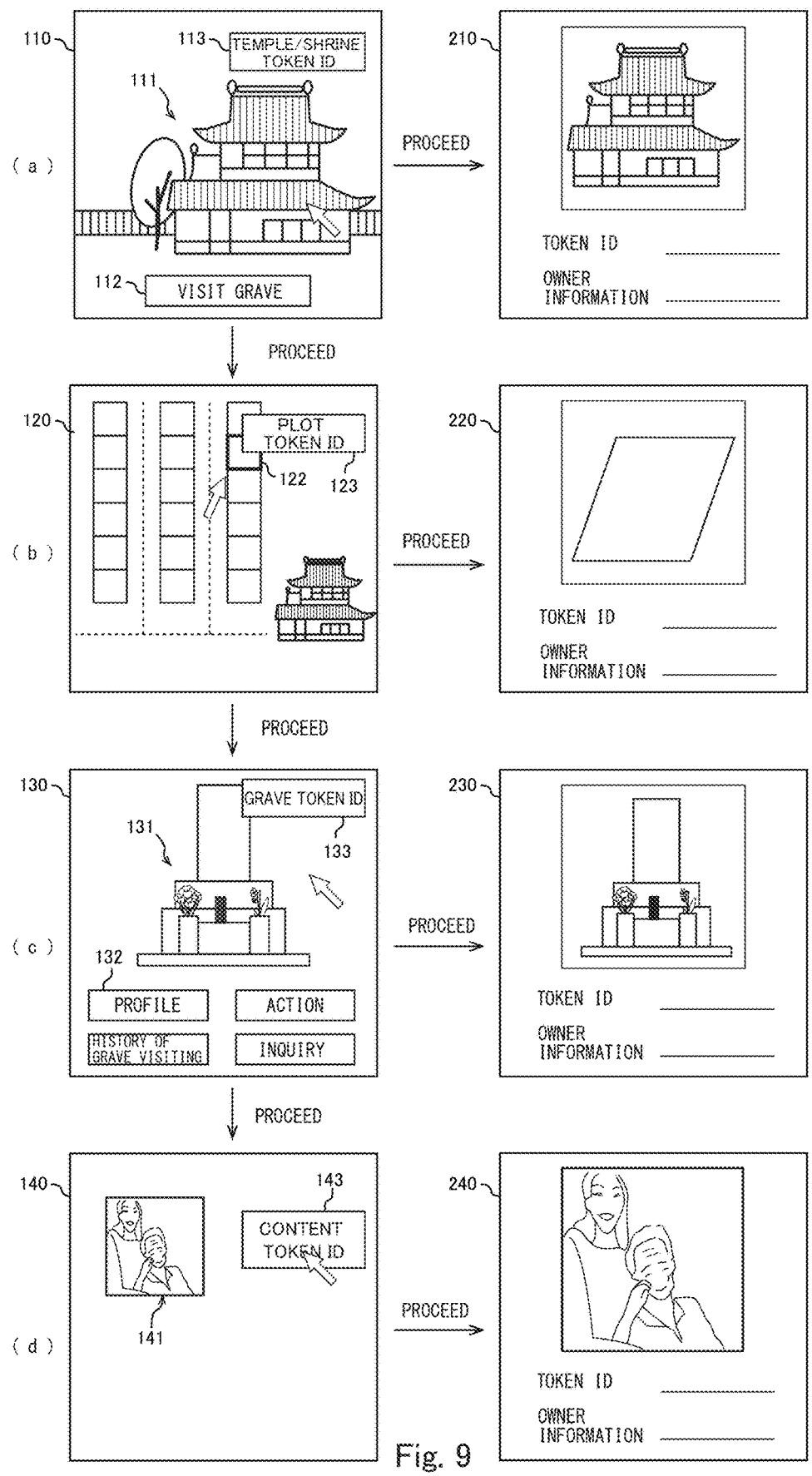
FIG. 9 is a diagram showing an example of a specific configuration of the virtual grave-visiting website managed by the information processing apparatus according to the embodiment.

In addition, that the link 119 to directly or indirectly proceed to the graveyard webpage 120 is posted on the temple/shrine webpage 110 means that, when the temple/shrine webpage 110 is described with html or css, a link tag that specifies the graveyard webpage 120 is described in the html file corresponding to the temple/shrine webpage 110. Therefore, the link 119 need not be always displayed on the temple/shrine webpage 110. For example, as shown in FIG. 9, the link 119 may be posted on a first text image 112 that is always displayed on the temple/shrine webpage 110, or a button with the link 119 posted thereon may be displayed in response to a user operation on the temple/shrine webpage 110, rather than the link 119 being always displayed on the temple/shrine webpage 110. For example, clicking a button that is always displayed on the temple/shrine webpage 110 to pull down an image or text with the link 119 posted thereon falls under the cases described above.

FIG. 9 is a diagram showing an example of a specific configuration of the virtual grave-visiting website managed by the information processing apparatus 1. As shown in FIG. 9, a temple/shrine image 111 that represents a virtual temple or shrine, a first text image 112 that visually shows a text "VISIT GRAVE", and a second text image 113 that visually shows a text representing a temple/shrine token ID associated with the temple/shrine image 111 are displayed on the temple/shrine webpage 110. On the first text image 112, a first link to directly proceed to the graveyard webpage 120 is posted. The first link specifies the URL of the destination graveyard webpage 120. On the second text image 113, a second link to proceed to the first webpage 210 on the NFT market place on which owner information of the temple/shrine image 111 is published is posted. The second link specifies the URL of the destination first webpage 210.

A plurality of plot images 122 are arranged on the graveyard webpage 120. The plurality of plot images 122 are each associated with a grave webpage 130. On each plot image 122, a first link to proceed to the grave webpage 130 associated with the plot image 122 is posted. The first link specifies the URL of the destination grave webpage 130. Furthermore, when a cursor is put on the plot image 122 through a user operation, a text image 123 that visually shows a text representing a plot token ID associated with the plot image 122 is displayed. On the text image 123, a second link to proceed to the second webpage 220 on the NFT market place on which owner information of the plot image 122 is published is posted. The second link specifies the URL of the destination second webpage 220.

A grave image 131 that represents a virtual grave, a first text image 132 that visually shows a text "PROFILE" that notifies the user of proceeding to the profile webpage 140, and a second text image 133 that visually shows a text that represents a grave token ID associated with the grave image 131 are displayed on the grave webpage 130. On the first text image 132, a first link to proceed to the profile webpage 140 is posted. The first link specifies the URL of the destination profile webpage 140. On the second text image 133, a second link for processing to the third webpage on the NFT market place on which owner information of the grave image 131 is published is posted. The second link specifies the URL of the destination third webpage 230.

A deceased image 141 and a text image 143 that visually shows a text representing a content token ID associated with the deceased image 141 are displayed on the profile webpage 140. On the text image 143, a link to proceed to the fourth webpage 240 on the NFT market place on which owner information of the deceased image 141 is published is posted. The link specifies the URL of the destination fourth webpage 240.

The information processing apparatus 1 according to this embodiment described above allows the user terminal 5 to display the grave webpage 130 as a virtual grave. Thus, a user, such as the family or a friend of the deceased, can visit a virtual grave on the Internet by accessing the grave webpage 130, and can remember and hold a memorial service for the deceased enshrined in the virtual grave.

The information processing apparatus 1 according to this embodiment has a function of providing a user who visits the grave webpage 130 with information that serves as a basis for determining whether the grave webpage 130 as a virtual grave on the Internet is legitimate. Typically, a legitimate virtual grave is a virtual grave that corresponds to a real grave. Of course, when there is no real grave of the deceased, the legitimate virtual grave may be a virtual grave of the deceased built on the Internet by the deceased themselves, a family member of the deceased, a friend of the deceased, or a person having a relationship with the deceased, such as a contract partner with whom the deceased has made a contract concerning the building of a virtual grave during their life. For example, for a reason that the existing real grave (first grave) of the deceased is a long way off, it is often the case that part of the deceased's ashes is removed from the existing real grave and buried in a new grave (second grave) built in the neighborhood. In such a case, although both the graves are graves of the deceased in which the deceased's ashes are buried, the original grave (first grave) of the deceased corresponds to the legitimate grave in this embodiment. The legitimate virtual grave can also be said as the older virtual grave or a virtual grave built by a person who administers the will of the deceased, for example.

On the grave webpage 130, the grave image 131 converted into an NFT is published. The grave image 131 converted into an NFT intrinsically cannot be used by anyone without permission from the owner. Therefore, using the grave image 131 converted into an NFT as a material of the grave webpage 130 means that the grave webpage 130 itself has been created on the will of the owner of the grave image 131.

On the grave webpage 130, in order that the owner of the grave image 131 can be easily checked, the link 138 to proceed to the webpage (third webpage 230) on the NFT market place on which owner information of the grave image 131 converted into an NFT is published is posted. When the link 138 is activated, the third webpage 230 is displayed on the user terminal 5. The user can check the owner information of the grave image 131 on the third webpage 230 and examine what kind of person the owner of the grave image 131 is, thereby determining whether the grave webpage 130 (virtual grave) is legitimate or not. For example, if the current or former owner of the grave image 131 is the owner of the real grave corresponding to the virtual grave, a family member of the deceased, a friend of the deceased or the like, it means that the grave webpage 130 is legitimate. On the other hand, any of the current and former owners of the grave image 131 does not have such relations with the deceased as described above, it means that the grave webpage 130 is illegitimate. In this way, by publishing the grave image 131 converted into an NFT on the grave webpage 130 and providing a function of allowing a check of the owner information of the grave image 131 converted into an NFT, information that serves as a basis for determining whether the grave webpage 130 is legitimate or not can be provided to the user. The profile webpage 140 whose owner is the same as that of the virtual grave also has a function of allowing a check of the owner information of the deceased image 141 converted into an NFT published on the profile webpage 140. Therefore, information that serves as a basis for determining whether the profile webpage 140 (deceased image 141) is legitimate or not can be provided to the user.

However, an outsider having no relations with the deceased may steal the identity of the deceased or a family member of the deceased to create the grave image 131, convert the created grave image 131 into an NFT and create the grave webpage 130 on which the grave image 131 converted into an NFT is published. Similarly, an outsider may create the profile webpage 140. Although the NFT conversion can ensure the oneness of digital data and validate the owner associated with the digital data, the NFT conversion does not ensure that the digital data itself is legitimate or the owner of the digital data is legitimate. Therefore, an outsider having no relations with the deceased can register a person having a relation with the deceased as the owner information of the grave image 131 or the deceased image 141. In such a case, the identity theft can hardly be detected by checking the owner information of the grave image 131 or the deceased image 141, and the virtual grave created by the outsider may be misidentified as a legitimate virtual grave. In view of this, focusing on the fact that the owner of the virtual grave and the owner of the deceased content are different from the manager of the virtual graveyard in which the virtual grave is built and the owner of the virtual temple or shrine having the virtual graveyard, the inventors have come up with an idea that if the temple/shrine webpage 110 and the graveyard webpage 120, which form the virtual grave-visiting website along with the grave webpage 130, is provided with the same function as the grave webpage 130, the identity theft described above can be prevented, and information that serves as a basis for determining that the grave webpage 130 is legitimate can be provided to the user.

Specifically, a temple/shrine image 111 converted into an NFT is published on the temple/shrine webpage 110, thereby indicating that the temple/shrine webpage 110 itself has been created on the will of the owner of the temple/shrine image 111. In addition, a link 118 to proceed to the webpage (first webpage 210) on the NFT market place on which the owner information of the temple/shrine image 111 converted into an NFT is published is posted on the temple/shrine webpage 110. The user can proceed to the first webpage 210 and check the owner information of the temple/shrine image 111 by operating the image or text with the link 118 posted thereon. For example, if the current or former owner of the temple/shrine image 111 is the owner of the real temple or shrine in which the real grave is built or the company operating and managing the virtual temple or shrine with which the deceased has made a contract during their life, it means that the temple/shrine webpage 110 is legitimate. That the temple/shrine webpage 110 is legitimate can be objective evidence that confirms the legitimacy of the grave webpage 130 that forms the virtual grave-visiting website along with the temple/shrine webpage 110. This improves the certainty that the grave webpage 130 is legitimate and provides a supporting fact to the determination of the user that the grave webpage 130 is legitimate. By publishing the temple/shrine image 111 converted into an NFT on the temple/shrine webpage 110 and providing a function of checking the owner information of the temple/shrine image 111 to the temple/shrine webpage 110 as described above, information that serves as a basis for determining whether the grave webpage 130 is legitimate can be provided to the user.

Furthermore, a plot image 122 converted into an NFT is published on the graveyard webpage 120, thereby indicating that the graveyard webpage 120 itself has been created on the will of the owner of the plot image 122. In addition, a link 128 to proceed to the webpage (second webpage 220) on the NFT market place on which the owner information of the plot image 122 converted into an NFT is published is posted on the graveyard webpage 120. The user can proceed to the second webpage 220 and check the owner information of the plot image 122 by operating the image or text with the link 128 posted thereon. For example, if the current or former owner of the plot image 122 is the manager of the real graveyard in which the real grave is built or the company operating and managing the virtual graveyard with which the deceased has made a contract during their life, it means that the graveyard webpage 120 is legitimate. That the graveyard webpage 120 is legitimate can be objective evidence of the legitimacy of the grave webpage 130 that forms the virtual grave-visiting website along with the graveyard webpage 120. This improves the certainty that the grave webpage 130 is legitimate and provides a supporting fact to the determination of the user that the grave webpage 130 is legitimate. By publishing the plot image 122 converted into an NFT on the graveyard webpage 120 and providing a function of checking the owner information of the plot image 122 to the graveyard webpage 120 as described above, information that serves as a basis for determining whether the grave webpage 130 is legitimate can be provided to the user.

As described above, the information processing apparatus 1 according to this embodiment has a function of checking the owner information of the temple/shrine webpage 110 that forms the virtual grave-visiting website along with the grave webpage 130 and the profile webpage 140 and a function of checking the owner information of the graveyard webpage 120, and thus can provide the user with information that serves as a basis for determining that the grave webpage 130 and the profile webpage 140 are legitimate. For example, suppose that the user has determined a virtual grave whose owner is a family member of the deceased to be legitimate with a reliability of 80%. If such a user is provided with an objective fact that the owner of the virtual temple or shrine is the legitimate owner of the real temple or shrine and an objective fact that the owner of the virtual graveyard is the legitimate manager of the real graveyard, the reliability of the determination that the virtual grave is legitimate can be brought closer to 100% from 80%. This is equivalent to the legitimacy of the virtual grave being ensured by the owner of the virtual temple or shrine and the owner of the virtual graveyard who have a relation with the virtual grave, and can improve the certainty that the virtual grave is legitimate.

In this embodiment, in order to confirm that the grave webpage 130 is legitimate, the same function as the grave webpage 130 is provided to the two webpages, the temple/shrine webpage 110 and the graveyard webpage 120. However, only at least one of the webpages is required to confirm the legitimacy of the grave webpage 130, so that the same function as the grave webpage 130 may be provided to only one of the temple/shrine webpage 110 and the graveyard webpage 120. Alternatively, the virtual grave-visiting website may be formed by only the grave webpage 130 and the temple/shrine webpage 110, or may be formed by only the grave webpage 130 and the graveyard webpage 120. Of course, the greater the number of confirmations, the higher the certainty that the virtual grave is legitimate is, so that the virtual grave-visiting website may have more webpages. When the legitimacy of the virtual grave does not have to be confirmed, the grave webpage 130 may singly exist on the Internet, or the other webpages forming the virtual grave-visiting website along with the grave webpage 130 do not have to have the same function as the grave webpage 130. Note that that a webpage has the same function as the grave webpage 130 means that the webpage contains an image relating to the webpage converted into an NFT and a link to proceed to a webpage on the NFT market place on which the owner information of the image converted into an NFT is published.

In this embodiment, a token ID is published on each of the temple/shrine webpage 110, the graveyard webpage 120, the grave webpage 130 and the profile webpage 140. This provides an advantage that the user can examine the image converted into an NFT associated with the token ID based on the token ID and the user having checked the token ID can have a feeling of security. However, since each of the webpages described above contains a link to the webpage on the NFT market place, the token ID does not always have to be published on each webpage.

One characteristic of the information processing apparatus 1 according to this embodiment is that the certainty that a particular webpage is legitimate is confirmed by another webpage that forms the website along with the particular webpage, thereby improving the probability that the particular webpage is legitimate. This characteristic can be applied to other websites than the virtual grave-visiting website and can preferably be applied to sales websites that sell artworks that are one-of-a-kind items, name-brand products with serial numbers or products sold in limited quantities.

Figure 10:
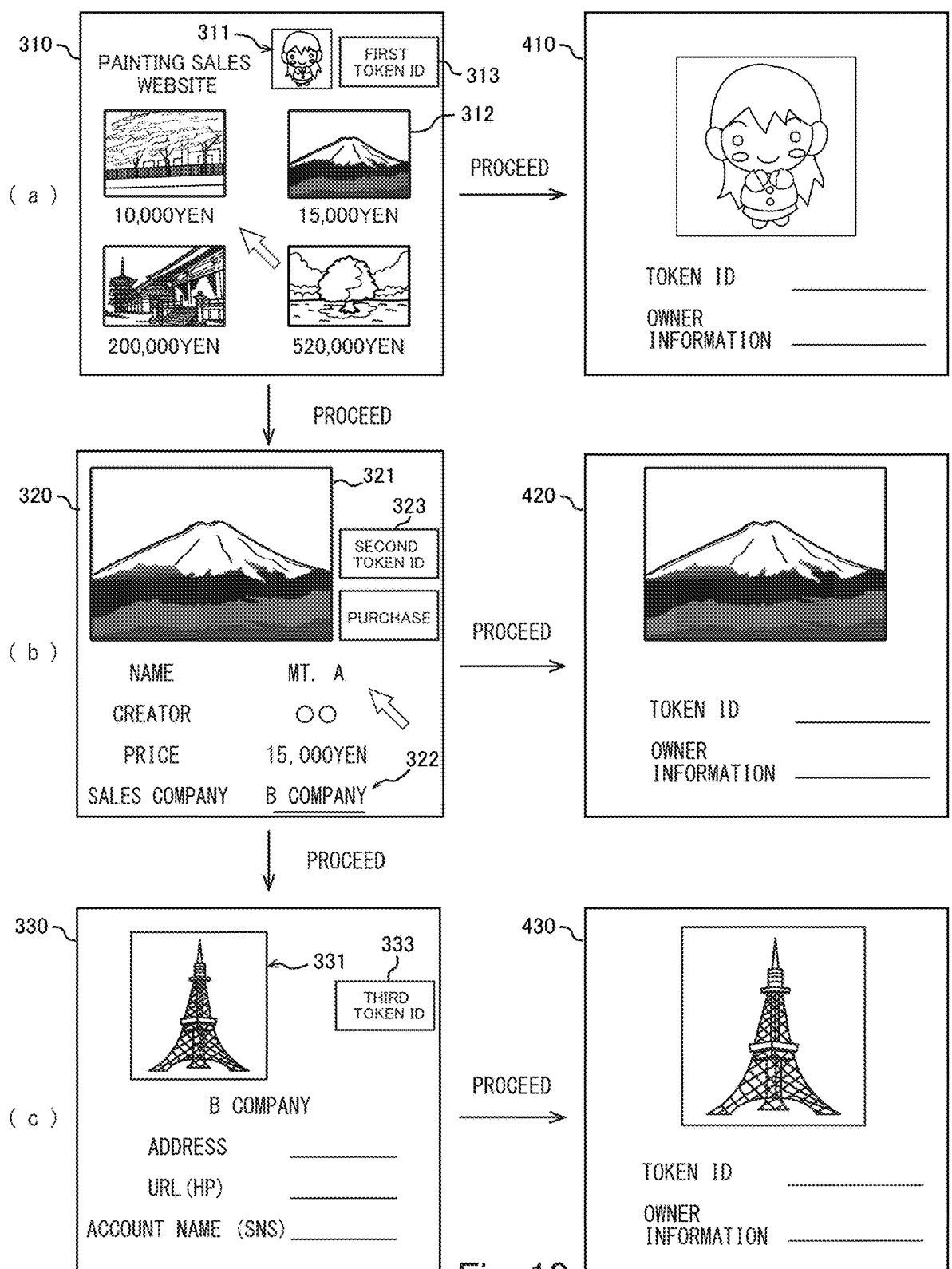
FIG. 10 is a diagram showing an example of a specific configuration of a painting sales website managed by the information processing apparatus according to a variation of the embodiment.

FIG. 10 is a diagram showing an example of a specific configuration of a painting sales website managed by the information processing apparatus 1 according to a variation of this embodiment. As shown in FIG. 10, the painting sales website is formed by a homepage 310, an article page 310 and a sales company page 330. On the homepage 310, a first link to directly or indirectly proceed to a webpage 410 on the NFT market place on which owner information of an operating company image 311 converted into an NFT published on the homepage 310 is published and a second link to directly or indirectly proceed to the article page 320 are posted. For example, the first link is posted on a text image 313 that represents a first token ID associated with the operating company image 311 converted into an NFT. The second link is posted on a corresponding article image 312.

On the article page 320, a first link to directly or indirectly proceed to a webpage 420 on the NFT market place on which owner information of an article image 321 converted into an NFT published on the article page 320 is published and a second link to directly or indirectly proceed to the sales company page 330 are posted. For example, the first link is posted on a text image 323 that represents a second token ID associated with the article image 321 converted into an NFT. The second link is posted on a text 322 that represents the sales company that sells the article.

On the sales company page 330, a link to directly or indirectly proceed to a webpage 430 on the NFT market place on which owner information of a sales company image 331 converted into an NFT published on the sales company page 330 is published is posted. For example, the link is posted on a text image 333 that represents a third token ID associated with the sales company image 331 converted into an NFT.

The information processing apparatus 1 according to the variation of this embodiment described above has the same advantages as the information processing apparatus according to this embodiment. That is, on the article page 320, the article image 321 converted into an NFT that represents the article (painting) is published. The article image 321 converted into an NFT intrinsically cannot be used by anyone without permission from the owner. Therefore, using the article image 321 converted into an NFT as a material of the article page 320 means that the article page 320 itself has been created on the will of the owner of the article image 321. Furthermore, on the article page 320, in order that the owner of the article image 321 can be easily checked, a link to proceed to the webpage 420 on the NFT market place on which owner information of the article image 321 converted into an NFT is published is posted. The user can check the owner information of the article image 321 on the webpage 420 by clicking the link. For example, if the current or former owner of the article image 321 is the creator of the painting article or the sales company of the article, it means that the article is legitimate. In this way, by publishing the article image 321 converted into an NFT on the article page 320 and providing a function of allowing a check of the owner information of the article image 321 converted into an NFT, information that serves as a basis for determining that the article is legitimate can be provided to the user.

Furthermore, the operating company image 311 converted into an NFT relating to the operating company that operates the painting sales website is published on the homepage 310, thereby indicating that the homepage 310 itself has been created on the will of the owner of the operating company image 311. In addition, a link to proceed to the webpage 410 on the NFT market place on which the owner information of the operating company image 311 converted into an NFT is published is posted on the homepage 310. The user can proceed to the webpage 410 on the NFT market place and check the owner information of the operating company image 311 by operating the link. For example, if the current or former owner of the operating company image 311 is the operating company of a real painting sales website or the like, it means that the homepage 310 is legitimate. That the homepage 310 is legitimate can be objective evidence that confirms the legitimacy of the article page 320 that forms the painting sales website along with the homepage 310. This means that the owner of the homepage 310 ensures that the article page 320 is legitimate, improves the certainty that the article page 320 is legitimate, and provides a supporting fact to the determination of the user that the article published on the article page 320 is legitimate.

Similarly, the sales company image 331 converted into an NFT relating to the sales company that sells the article is published on the sales company page 330, thereby indicating that the sales company page 330 itself has been created on the will of the owner of the sales company image 331. In addition, a link to proceed to the webpage 430 on the NFT market place on which the owner information of the sales company image 331 converted into an NFT is published is posted on the sales company page 330. The user can proceed to the webpage 430 on the NFT market place and check the owner information of the sales company image 331 by operating the link. For example, if the owner of the sales company image 331 is a real sales company that sells paintings, a representative of the sales company or the like, it means that the sales company page 330 is legitimate. That the sales company page 330 is legitimate can be objective evidence that confirms the legitimacy of the article page 320 that forms the painting sales website along with the sales company page 330. This means that the owner of the sales company page 330 ensures that the article page 320 is legitimate, improves the certainty that the article page 320 is legitimate, and provides a supporting fact to the determination of the user that the article published on the article page 320 is legitimate.

As described above, the information processing apparatus 1 according to the variation of this embodiment have the same advantages as the information processing apparatus 1 according to this embodiment. The information processing apparatus 1 according to the variation has a function of allowing a check of the owner information of the homepage 310 that forms the website along with the article page 320 and a function of allowing a check of the owner information of the sales company page 330, and therefore can provide the user with information that serves as a basis for determining that the article page 320 is legitimate. The user can comprehensively determine whether the article published on the article page 320 is legitimate by checking the owner information of each webpage that forms the painting sales website.

Note that as shown in FIG. 10, on the sales company page 330, an SNS account name of the sales company, the URL of the website of the sales company or the like may be published as information that can be objective evidence that the sales company is legitimate. Of course, a link to proceed to the SNS account page of the sales company or a link to proceed to the website of the sales company may be posted. For example, the certainty that the sales company page 330 is legitimate can be improved by accumulating objective facts that the SNS account of the sales company has many followers, that the sales company has got many replies to its SNS posts, and that the SNS account of the sales company is verified as official by the operating company of the SNS. This means that users of the SNS or the operating company of the SNS ensures that the sales company is legitimate.

Of course, on the temple/shrine webpage 110, an SNS account name of the owner of the temple/shrine webpage 110, that is, the owner of the temple/shrine image converted into an NFT, a website of the owner or the like may be published, or a link to proceed to those webpages may be posted. This can improve the certainty that the temple/shrine webpage 110 is legitimate and thus the grave webpage 130 is legitimate. Similarly, on the graveyard webpage 120, an SNS account name of the owner of the graveyard webpage 120, that is, the owner of the plot image converted into an NFT, a website of the owner or the like may be published, or a link to proceeds to those webpages may be posted. This can improve the certainty that the graveyard webpage 120 is legitimate and thus the grave webpage 130 is legitimate.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

REFERENCE SIGNS LIST

1 . . . information processing apparatus, 2 . . . NFT management system, 3 . . . NFT management server apparatus, 4 . . . block chain, 41, 42, 43, 44 . . . node (computer), 5 . . . information processing terminal (user terminal), 9 . . . network (public telecommunication network)

The invention claimed is:

1. An information processing apparatus that manages a website including a temple/shrine webpage relating to a virtual temple or shrine and a grave webpage relating to a virtual grave, comprising:
   means for receiving a first transmission request for the temple/shrine webpage from an external information processing terminal;
   means for transmitting data of the temple/shrine webpage to the information processing terminal in response to the received first transmission request;
   means for receiving a second transmission request for the grave webpage from the external information processing terminal; and
   means for transmitting data of the grave webpage to the information processing terminal in response to the received second transmission request,
   wherein on the temple/shrine webpage, a link to directly or indirectly proceed to a first webpage on an NFT market place on which an owner of a temple/shrine content relating to the temple/shrine webpage is published is posted, and a link to directly or indirectly proceed to the grave webpage is posted, on the grave webpage, a link to directly or indirectly proceed to a second webpage on the NFT market place on which an owner of a grave content relating to the grave webpage is published is posted, and
   a storage unit that stores a temple/shrine token ID that is issued when the temple/shrine content is converted into an NFT and a grave token ID that is issued when the grave content is converted into an NFT, wherein the temple/shrine token ID is published on the temple/shrine webpage, and the grave token ID is published on the grave webpage.

2. The information processing apparatus according to claim 1, wherein the temple/shrine content is published on the temple/shrine webpage, and the grave content is published on the grave webpage.

3. An information processing apparatus that manages a website including a temple/shrine webpage relating to a virtual temple or shrine, a graveyard webpage relating to a virtual graveyard and a grave webpage relating to a virtual grave, comprising:
  means for receiving a first transmission request for the temple/shrine webpage from an external information processing terminal;
  means for transmitting data of the temple/shrine webpage to the information processing terminal in response to the received first transmission request;
  means for receiving a second transmission request for the graveyard webpage from the external information processing terminal;
  means for transmitting data of the graveyard webpage to the information processing terminal in response to the received second transmission request;
  means for receiving a third transmission request for the grave webpage from the external information processing terminal; and
  means for transmitting data of the grave webpage to the information processing terminal in response to the received third transmission request,
  wherein on the temple/shrine webpage, a link to directly or indirectly proceed to a first webpage on an NFT market place on which an owner of a temple/shrine content relating to the temple/shrine webpage is published is posted, and a link to directly or indirectly proceed to the graveyard webpage is posted, on the graveyard webpage, a link to directly or indirectly proceed to a second webpage on the NFT market place on which an owner of a graveyard content relating to the graveyard webpage is published is posted, and a link to directly or indirectly proceed to the grave webpage is posted, on the grave webpage, a link to directly or indirectly proceed to a third webpage on the NFT market place on which an owner of a grave content relating to the grave webpage is published is posted, and
  a storage unit that stores a temple/shrine token ID that is issued when the temple/shrine content is converted into an NFT, a plot token ID that is issued when the graveyard content is converted into an NFT, and a grave token ID that is issued when the grave content is converted into an NFT, wherein the temple/shrine token ID is published on the temple/shrine webpage,
  the plot token ID is published on the graveyard webpage, and the grave token ID is published on the grave webpage.

4. The information processing apparatus according to claim 3, wherein the temple/shrine content is published on the temple/shrine webpage, the graveyard content is published on the graveyard webpage, and the grave content is published on the grave webpage.

5. An information processing apparatus that manages a website including a temple/shrine webpage relating to a virtual temple or shrine, a graveyard webpage relating to a virtual graveyard, a grave webpage relating to a virtual grave, and a profile webpage relating to a content of a deceased enshrined in the virtual grave, comprising:
  means for receiving a first transmission request for the temple/shrine webpage from an external information processing terminal;
  means for transmitting data of the temple/shrine webpage to the information processing terminal in response to the received first transmission request;
  means for receiving a second transmission request for the graveyard webpage from the external information processing terminal;
  means for transmitting data of the graveyard webpage to the information processing terminal in response to the received second transmission request;
  means for receiving a third transmission request for the grave webpage from the external information processing terminal;
  means for transmitting data of the grave webpage to the information processing terminal in response to the received third transmission request,
  means for receiving a fourth transmission request for the profile webpage from the external information processing terminal; and
  means for transmitting data of the profile webpage to the information processing terminal in response to the received fourth transmission request,
  wherein on the temple/shrine webpage, a link to directly or indirectly proceed to a first webpage on an NFT market place on which an owner of a temple/shrine content relating to the temple/shrine webpage is published is posted, and a link to directly or indirectly proceed to the graveyard webpage is posted, on the graveyard webpage, a link to directly or indirectly proceed to a second webpage on the NFT market place on which an owner of a graveyard content relating to the graveyard webpage is published is posted, and a link to directly or indirectly proceed to the grave webpage is posted, and on the grave webpage, a link to directly or indirectly proceed to a third webpage on the NFT market place on which an owner of a grave content relating to the grave webpage is published is posted, and a link to directly or indirectly proceed to the profile webpage is posted, on the profile webpage, a link to directly or indirectly proceed to a fourth webpage on the NFT market place on which an owner of a deceased content relating to the profile webpage is published is posted, and
  a storage unit that stores a temple/shrine token ID that is issued when the temple/shrine content is converted into an NFT, a plot token ID that is issued when the graveyard content is converted into an NFT, a grave token ID that is issued when the grave content is converted into an NFT, and a content token ID that is issued when the deceased content is converted into an NFT, wherein the temple/shrine token ID is published on the temple/shrine webpage, the plot token ID is published on the graveyard webpage, the grave token ID is published on the grave webpage, and the content token ID is published on the profile webpage.

6. The information processing apparatus according to claim 5, wherein the temple/shrine content is published on the temple/shrine webpage, the graveyard content is published on the graveyard webpage, the grave content is published on the grave webpage, and the deceased content is published on the profile webpage.

* * * * *